Dec. 9, 1958                R. H. BEADLE                2,863,436
              FUEL REGULATING MEANS FOR GAS ENGINES
                      Filed April 20, 1956
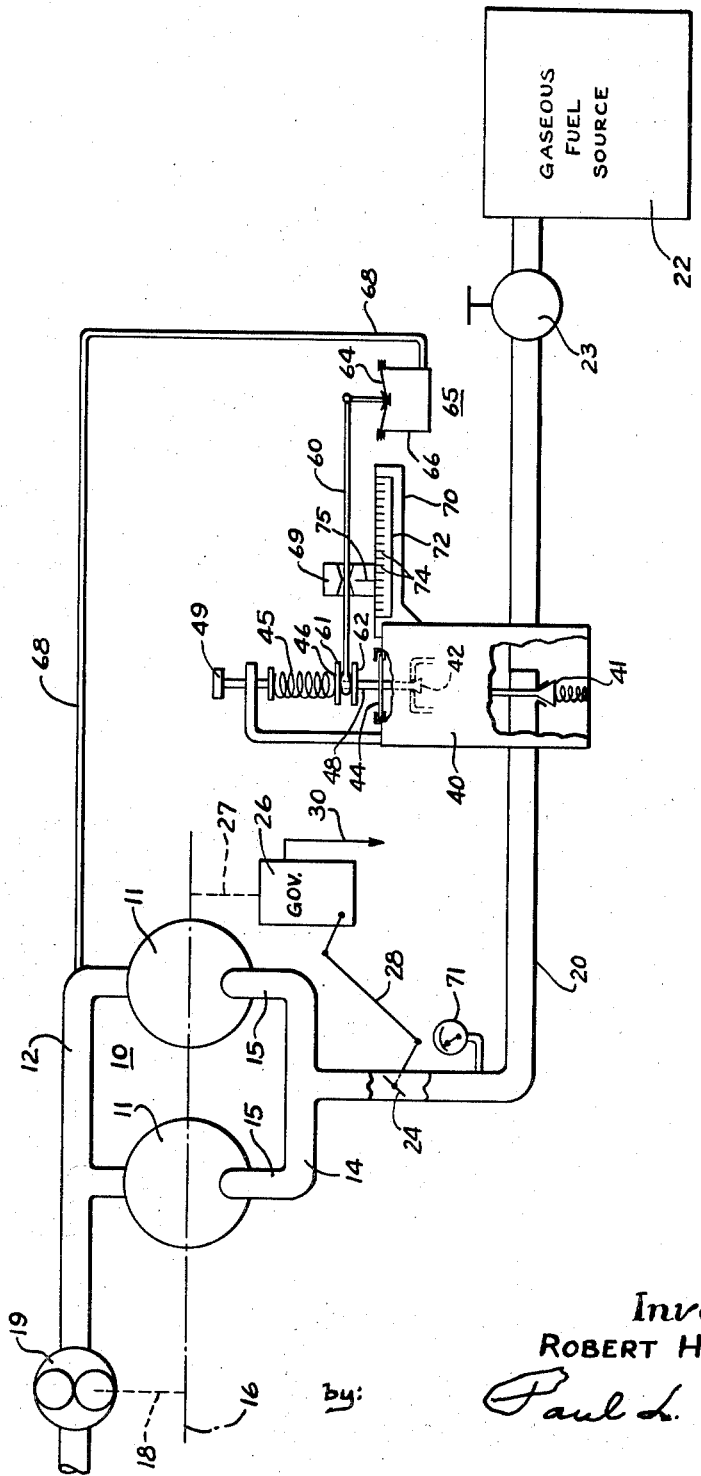
Inventor
ROBERT H. BEADLE
by: Paul L. Kroher
Atty.

United States Patent Office 2,863,436
Patented Dec. 9, 1958

2,863,436

FUEL REGULATING MEANS FOR GAS ENGINES

Robert H. Beadle, Beloit, Wis., assignor to Fairbanks, Morse & Co., Chicago, Ill., a corporation of Illinois Application April 20, 1956, Serial No. 579,551

3 Claims. (Cl. 123—120)

This invention relates to improvements in fuel supply systems for internal combustion engines adapted for operation on suitable gaseous fuels, as natural gas, propane or the like. It has particular reference to two-cycle gas engines of variable speed type, such as are employed with oil field drill rigs and the like, or generally in installations where a gaseous fuel is readily available.

In engines of the character indicated, cylinder admission of gas fuel usually is controlled by constant lift cylinder valves wherein the open periods of the valves are of constant duration, while gas supply to the intake manifold associated with such valves, is regulated by a gas throttle valve controlled by an engine load or torque responsive governor. In the control of fuel supply to engines of this type, it is a common expedient to employ a suitable pressure reducer valve set to determine the pressure of gas fuel delivered to the throttle valve at a desired constant value, and then to rely on the pressure-reducing or throttling effect of the throttle valve to regulate fuel pressure in delivery to the engine. However, certain difficulties in producing effective engine operation over the entire speed and load range, have been encountered with engines having a fueling system as above outlined. These difficulties are due primarily to the constant, set pressure of gas in delivery to the throttle valve, and to governor regulation of the throttle valve in accordance with engine load or torque output, but not in accordance with engine speed. It is found, for example, that at low and intermediate engine speeds, as well as in instances of rapid acceleration, the indicated fuel system operates to supply the engine with gas fuel at pressures and in quantity greater than necessary for effective engine function under the speed conditions indicated. This often results in "engine flooding" or too rich, difficult-to-ignite, mixtures in the cylinders. Again, at higher speeds up to the normal maximum speed, the gas fuel in supply to the engine may be, and often is, at a pressure lower than required. This results, at times, in cylinder mixtures which are too lean for effective engine operation.

In overcoming the foregoing difficulties and securing proper engine operation over its full range, on a given gas fuel of known B. t. u. heat value, it has been determined that the necessary or optimum pressure of gas supply to the engine under a given engine torque output condition, varies in direct proportion to engine speed. For example, with a given engine operating under a certain torque output at a speed of, say 1200 R. P. M., the gas supply pressure required for effective engine operation, may be 31 p. s. i. gauge, while at a speed of 550 R. P. M. with the same torque output, the required gas pressure may be 14.5 p. s. i. g. Assuming in the above example, that the given speeds represent the upper and lower speed limits of the engine, the gas pressure required at any speed intermediate these limits, is then at a pressure value between the indicated 31 and 14.5 p. s. i. gauge, in direct proportion to engine speed. The gas pressure values suggested for the upper and lower engine speed limits as given, are presented in relation to gas fuel of given B. t. u. heat value, but it is to be understood that for gas fuel of a different heat value, these pressure values will differ accordingly.

It is the principal object of the present invention, then, to afford in an engine fueling system as hereinabove mentioned, a control provision arranged in the line of gas fuel supply to the engine throttle valve, and operable automatically to determine the gas supply pressure at values in direct proportion to engine speed.

Another object is to provide a control provision as indicated, which in adjusting or modulating the gas pressure in direct proportion to engine speed variations, results in proper engine operation over its entire speed and load range, and serves in addition, to effect a desirable limitation upon the maximum torque of the engine at any speed, which thus prevents over-load abuse of the engine.

A further object is to afford a control provision for the purpose indicated, which comprises a gas pressure regulator valve device embodying control means normally adjustable for regulating or setting the device to establish the pressure of gas in discharge from the device, and engine speed influenced adjusting means for said control means, adapted and arranged for effecting adjustments of the control means in direct accordance with variations in engine speed, whereby to produce corresponding changes in the pressure of gas discharge from the device.

A still further object is to provide a control of the character generally indicated in the preceding object, wherein the engine speed influenced adjusting means includes an adjustment provision therefor through which the adjusting means may be regulated in adapting the regulator valve device to gas fuels of various predetermined B. t. u. heat values.

The foregoing and other objects and advantages of the present invention will appear more fully, upon consideration of the following description of a presently preferred embodiment thereof as exemplified in the accompanying drawing, wherein the single figure is a diagrammatic view showing an engine and gas fuel supply system therefor, with the present gas pressure regulator provision shown schematically in the system.

Referring to the drawing, illustrated diagrammatically at 10 is a variable speed internal combustion engine which may be of two-cycle type, adapted for operation on suitable gaseous fuel, as natural gas, propane or the like. The engine as shown, includes cylinders 11, a scavenging and combustion air supply manifold 12 in connection to the cylinders, a gas fuel inlet manifold 14 having branches 15 each leading to the cylinder inlet valve (not shown) of the associated cylinder, and the engine crankshaft indicated by the broken line 16. Driven from the crankshaft, as by the drive connection indicated by the broken line 18, is a suitable blower or compressor 19 of a type to afford an adequate volumetric supply of air in the manifold 12, under a pressure which is in direct proportion to engine speed.

Connected to the engine gas manifold 14 is a gas supply conduit 20 which extends from a source of gas fuel under a predetermined source pressure, such source being represented by the tank 22. Included in the conduit 20 are a manual shut-off valve 23 and a gas throttle valve 24 illustrated as a "butterfly" type valve. Throttle valve 24 is controlled or regulated by a governor 26 of suitable, well-known form, which is engine driven through connection 27 to the engine crankshaft 16, and operates in accordance with engine torque output or loading. The throttle valve and governor are operatively connected by linkage generally indicated at 28, while the governor is settable for load responsive operation at selected engine speeds, by speed setting mechanism (not shown)

embodied in the governor and controlled manually through linkage indicated at 30.

Arranged in the gas supply conduit 20 at a suitable point therein which is anterior to the throttle valve 24, is a pressure regulator valve device generally indicated at 40. Device 40 may be of suitable, readily available type, providing a main gas throttling valve indicated at 41, and valve positioning means (not shown) which is controlled in known manner by a pilot valve control indicated in outline at 42. Pilot valve operation is determined through a differential pressure responsive diaphragm 44 subjected on its under side to the pressure of gas fuel at the outlet side of main valve 41 (as the pressure of gas in the conduit 20 between the valve 41 and throttle valve 24), and on its upper side to an opposing pressure provided, in part, by a spring 45 in compression against the outer end 46 of the pilot valve stem 48. The compression of spring 45 is adjustable or settable by an adjusting screw 49. As is well known in regulators of this type, an increase in the compression of spring 45 to effect a corresponding increase in the opposing force thereof on diaphragm 44, results in pilot valve control of the main valve 41 to determine such increased gas pressure at the regulator output to conduit 20 as will rebalance the pilot valve diaphragm, and hence, establish the pressure of gas fuel in supply to the throttle valve 24 at a value corresponding to the then adjusted compression setting of the spring 45. A decrease in spring compression on the pilot diaphragm, will effect on the other hand, a correspondingly lower gas pressure in supply to the throttle valve 24.

In accordance with the present invention, the effect of spring 45 on the pilot diaphragm is augmented or modulated by means acting on the diaphragm of the pilot valve control to impose a force thereon in direct proportion to engine speed, which results in operation of the regulator valve device 40 to determine the pressure of gas supply to the throttle valve 24 at pressure values varying in direct proportion with engine speed variations. The modulating means shown schematically in the drawing, is comprised in general of a fulcrumed lever 60 having one end engaged between upper and lower flanges 61 and 62, respecively, on the pilot valve stem 48. The opposite end of the lever is connected to the movable element or piston 64 (here shown as a diaphragm) of a fluid pressure operated servo-motor indicated at 65, the cylinder or pressure chamber 66 of which is in connection by conduit 68, with the engine air manifold 12. The lever 60 is pivotally supported, intermediate its ends, by a fulcrum or pivot 69 of suitable character, which is positionally adjustable along the lever, as on support 70.

With proper setting of the lever fulcrum 69 and selected adjustment of the spring 45, the pressure regulating function of device 40 may be determined such that at engine idling speed, for example, the pressure of gas supply to the throttle valve 24 will be at the pressure required for engine operation under the idling condition. Further in the example given, upon increase in engine speed to a low or intermediate operating speed, the modulating lever control responds in direct proportion to the increased engine speed, as measured by the corresponding increased air pressure in the engine air manifold 12, to increase the loading force on the pilot valve diaphragm correspondingly, and thereby cause the regulator 40 to determine the gas pressure at the value required for effective engine operation under the higher speed condition. With increase in speed to the normal maximum engine speed, the modulating lever device responds in proportion to the engine speed, to further increase the valve diaphragm loading force correspondingly and up to a maximum determined by the maximum engine speed, for causing like increase in the gas pressure at the throttle valve to values necessary for effective engine function at high speeds. Of course, with decrease in engine speed, the modulating lever provision operates in the reverse of the foregoing, as to cause the pressure regulator to re-adjust gas pressure to the required lower values.

It will be appreciated from the foregoing, that by adjusting the function of the pressure regulator 40 through the modulating lever provision acting in direct proportion to engine speed, the gas pressure at the throttle valve 24 may be set in direct accordance with engine speed, such that for any given engine speed, the gas pressure is at the necessary or optimum pressure value required for effective engine operation over its load range at the given engine speed. Thus, with speed proportioning of gas pressure in this manner, the load limit for any given engine speed may be determined by the gas pressure setting for the given speed. Consequently, over-loading of the engine at any given speed, is precluded by the present gas pressure regulating provision.

In the indicated embodiment, the adjustable spring 45 affords a fixed force on the pilot diaphragm of the regulator, variable in value according to the adjusted setting of the spring, while the pivoted lever provision provides a modulating force automatically varying in proportion to engine speed. The force ratio of the lever provision is adjustable, as previously indicated, by varying the position of the lever fulcrum 69, whereby to permit of adjustments in the operation of the provision to accommodate given conditions of a given engine installation, and to adapt the modulating control to the B. t. u. heat value of the gas fuel. The manner of effecting the indicated adjustments is preferably in accordance with the following example:

Assume a given engine installation wherein the upper and lower engine speed limits are 1250 R. P. M. and 550 R. P. M., respectively, and the available gas fuel supply for the engine has an average or lower heat value of 1020 B. t. u.'s per standard cubic foot of gas. As predetermined by test under the above conditions and with the engine running at no load, it is found that the gas pressure in supply to the engine throttle valve should closely approximate 14.5 p. s. i. gauge at the minimum engine speed of 550 R. P. M., and 33 p. s. i. gauge at the maximum speed of 1250 R. P. M. Now with gas fuel supplied to the pressure regulator device at say a minimum of 50 p. s. i. gauge, the engine is started and operated under no load at 550 R. P. M. The regulator spring 45 then is adjusted until the spring pressure plus the additional pressure imposed by the speed responsive lever 60, then effective on the pilot diaphragm 44 is such as to set the regulator for determining the gas pressure at the throttle valve (which may be observed on a pressure guage 71 in the conduit 20), at the desired value of 14.5 p. s. i. gauge. Whereupon, the engine speed is increased to 1250 R. P. M. at no load. If the pressure on gauge 71 is greater than the desired 33 p. s. i., the engine is stopped and the lever fulcrum 69 then moved in the direction way from the lever end in engagement with the pilot valve stem. To facilitate this adjustment, the fulcrum support may be provided with a suitable scale, indicated at 72, providing graduations 74 in cooperation with a reference line 75 on the fulcrum. The graduations may be set to indicated approximately a ½ p. s. i. gauge change per graduation. Thus, if the gauge pressure read 34 p. s. i., the fulcrum would be moved 2 graduations of the scale, in the direction indicated. On the other hand, if the pressure was below 33 p. s. i. gauge, the fulcrum is moved in the opposite direction by the number of scale graduations required according to the amount of pressure deficiency. After such fulcrum adjustment, the engine is again run at 550 R. P. M., and the spring 45 then adjusted, if necessary, until the gauge pressure reads 14.5 p. s. i. Following this, the engine speed is increased to 1250 R. P. M., and the gauge pressure is then observed. If the pressure is substantially at 33 p. s. i. gauge, the regulator is in proper adjustment for engine operation over its full speed and load range, with the lever control 60 acting to regulate the pressure of gas supply to the throttle valve within the indicated pressure range, in direct proportion to engine speed. If, however, the gas pressure at 1250 R. P. M. under the no load condition of the engine, is not at the required 33 p. s. i. gauge value, then the foregoing described adjustment steps must be repeated until the required pressure conditions are obtained.

An important advantage of the gas pressure regulating provision as here made, and the manner of its adjustment to obtain the desired gas pressure range in proportion to engine speed, is found in the fact that the adjustments are effected in the manner indicated, without requiring any loading of the engine. Hence, there is avoided any necessity or requirement for providing test load equipment for the engine.

Having now described and illustrated a presently preferred embodiment of the invention, what it is desired to claim and secure by Letters Patent is:

1. In a fuel supply system for an internal combustion engine operable on gas fuel and having a combustion air supply system wherein the air pressure is proportional to engine speed, a pressure regulator device for determining the pressure of gas fuel supply for the engine, said device having regulatable control means to condition the device for determining gas supply pressure, manually adjustable spring means for regulating said control means, and means for additionally regulating said control means, comprising a pivotal member in operative engagement with said control means, and pressure operated means connected to the member and responsive to air pressure variations in said air supply system, for pivotally actuating said member.

2. In a fuel supply system for an internal combustion engine operable on gas fuel and having combustion air supply means wherein the air pressure is proportional to engine speed, a presure regulator device in the fuel system for determining the pressure of gas fuel supply for the engine, said device including a control regulatable to condition the device for determining the gas supply pressure, manually adjustable spring means imposing a control regulating force on said control, and adjustable means imposing on said control an additional regulating force proportional to engine speed, the last said means comprising a pivotal member in operative engagement with said control, adjustably positionable fulcrum means pivotally supporting said member, and pressure operated means connected to the member and responsive to air pressure variations in said air supply means, for pivotally actuating said member.

3. In a fuel supply system for a variable speed internal combustion engine operable on gas fuel and having an engine governor controlled throttle valve for controlling gas fuel delivery to the engine, means for supplying gas fuel under pressure to the throttle valve, said means including a pressure regulator having a control adjustable for conditioning the regulator to determine the pressure of gas supply to the throttle valve variably in accordance with adjustments of the control, spring means acting on said control and adjustable for effecting adjustments of the control, and additional means for effecting adjustments of said control, the last said means comprising a pivotal lever in operative connection to said control, lever pivot means adjustably positionable intermediate the ends of the lever, and lever operating means connected to the lever and operable automatically in accordance with speed conditions of the engine.

References Cited in the file of this patent
UNITED STATES PATENTS
2,666,422    Kenworthy et al. _____ Jan. 19, 1954
FOREIGN PATENTS
695,878    Germany _____ Sept. 5, 1940